April 22, 1941.	R. H. GLEASON	2,239,502
FERTILIZER APPLICATOR
Filed April 24, 1939
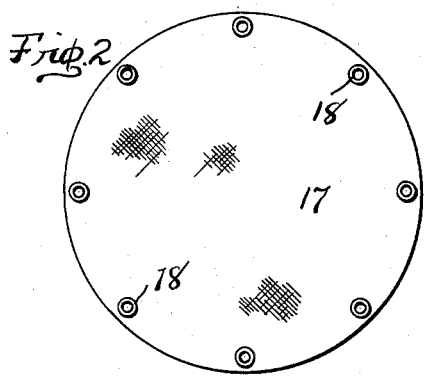
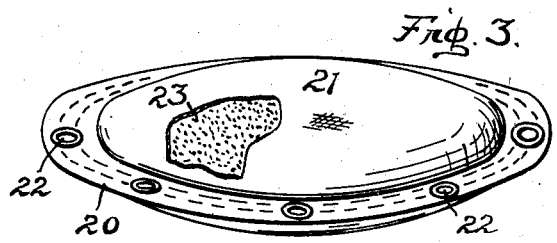
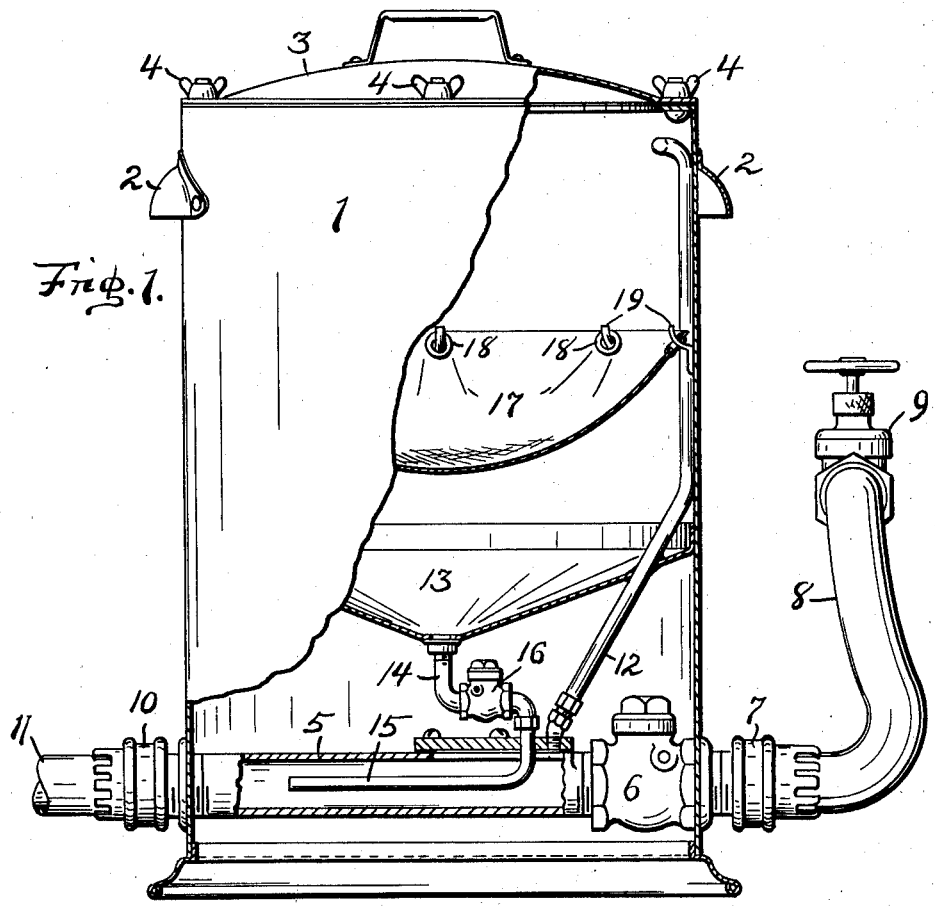
Robert H. Gleason INVENTOR.
BY
H. G. Burns ATTORNEY.

Patented Apr. 22, 1941

2,239,502

UNITED STATES PATENT OFFICE 2,239,502

FERTILIZER APPLICATOR

Robert H. Gleason, Van Wert, Ohio

Application April 24, 1939, Serial No. 269,705

1 Claim. (Cl. 299—84)

This invention relates to fertilizer applicators of the type in which a soluble form of fertilizer is immersed in water and the solvent is introduced into the flow stream of water passing through a hose from which the water together with the entrained solvent is distributed over the area to be fertilized.

An object of the invention is to provide an inexpensive appliance by means of which is conveniently and expeditiously carried out distribution of a fertilizer substance over lawns and other areas in an advantageous condition to promote growth of the vegetation to be effected thereby.

An illustrative embodiment of the invention is shown in the accompanying drawing, in which:

Fig. 1 is a side view of an apparatus in which the invention is incorporated, a portion thereof being in section;

Fig. 2 is a plan view of a hammock preferably of pervious woven material; and

Fig. 3 is a perspective view of a modified hammock in the form of an envelope in which is contained a charge of fertilizer material, a portion thereof being cut away.

The illustrative embodiment of the invention consists of a vessel 1 provided with hand-holes 2 and closed at its upper end by a removable lid 3 having nuts 4 for securing it in closed position.

A pipe fixture 5 is secured in the lower end of the vessel, the ends of which extend through the opposite sides thereof, and an outflow check valve 6 is connected in the pipe near one end thereof preferably located within the vessel. A coupling 7 is provided at one end of the vessel for attachment to a hose 8 that is also connected with a source of water supply such as through a sill cock 9 by which the stream of water passing therethrough is regulated. The opposite end of the pipe 5 has a similar coupling 10 for connection to a hose 11 through which water passing from the source of supply is distributed to wherever required.

A by-pass tube 12 is connected at one end with the pipe fixture 5 with which it has uninterrupted communication at its lower end. The upper end of the by-pass tube is open and terminates within the upper end of the vessel 1 so that when water passes through the pipe fixture 5 under pressure, a fractional portion of the flow stream therein passes into the vessel.

Within the lower part of the vessel, above the pipe fixture 5, is secured a funnel-shaped partition 13, and an ejector tube 14 is connected at its upper end so as to have communication through the partition at the nadir thereof. The lower portion 15 of the ejector tube extends into the pipe fixture 5 and projects preferably forwardly along the axial center thereof. The ejector tube has connected therein an outflow check valve 16 whereby is prevented backflow of water from the pipe fixture past the partition 13 into the vessel that otherwise would occur in the event the lid 3 is removed to permit renewal of the charge of fertilizer while the cock 9 is left open and the outflow of water through the hose 11 is shut off. Thus, surging of the dissolved fertilizer in the vessel is obviated.

Suspended within the vessel at a point above the partition 13 is a pervious hammock 17 that preferably has an annular series of marginal grommets 18 which connect with a corresponding annular series of hooks 19 that project interiorly from the wall of the vessel. In this manner the hammock is suspended in operative position.

The hammock preferably is formed of such material as burlap or other loosely woven fabric such as filter cloth.

In Fig. 3 is illustrated a modification of the hammock which is in the form of an envelope consisting of sheets 20 and 21 the marginal edges of which are connected together and are provided with an annular series of grommets 22 for connection with the hooks 19, whereby to suspend the envelope in the vessel in the same manner as the hammock 17. The sheets of which the envelope, as in the hammock, is formed of pervious material so as to permit saturation of fertilizer material 23 that is initially deposited within the envelope.

Operation

In use, the appliance is arranged with the pipe fixture 5 connected in line between the supply hose connection 8 and the distributing hose 11 so as to establish a continuous flow of water from the source of water supply through the pipe fixture and distributing hose. Soluble fertilizer material is deposited in the hammock through the top of the vessel after which the vessel is closed by its lid 3. The sill cock is then opened whereupon flow of water occurs through the pipe fixture and distributing hose, and incidentally a portion of water flows into the vessel through the by-pass tube 12 onto the deposited fertilizer material which thereupon becomes dissolved. The resultant water solvent together with the entrained dissolved fertilizer passes into the funnel-shaped partition and is drawn therefrom through the ejector tube 14 into the outflow stream in the pipe fixture 5 and is finally discharged through the distributing hose onto the area to be fertilized. The outflow check valves 6 and 16 circumvent back passage of the solvent into the source of water supply thereby obviating contamination of water in the supply line while the appliance is dormant as well as at any other time.

By use of the hammock in the modified form, the fertilizer material is supplied in envelope units affording convenience in handling the fertilizer material and in transporting the material from the source of supply to the appliance where it is eventually used.

In both instances, the fertilizer material becomes dissolved during the passage of water that flows through the by-pass pipe into the vessel, and the water solvent is withdrawn from the lower part of the vessel through the ejector tube and is entrained with the flow stream in the distributing hose and is finally discharged.

Variations from the particular construction above disclosed may readily be made by exercise of engineering skill without departure from the spirit or scope of the invention, and the following claim is intended to be inclusive of such variations.

What I claim is:

A fertilizer applicator constituted of a closed vessel having a partition between its top and bottom, a pervious hammock sususpended in said vessel above said partition, a pipe fixture extending through said vessel below said partition provided near one end thereof with an outflow check valve, a by-pass tube communicating with said pipe fixture and also with said vessel at a point therein above said hammock, an outflow check valve-controlled ejector tube operatively associated with said fixture having communication with said vessel through said partition at the nadir thereof, and means to create a flow stream through said by-pass tube, vessel, ejector tube and fixture.

ROBERT H. GLEASON.